United States Patent Office 3,467,487
Patented Sept. 16, 1969

3,467,487
IMPARTING ANTISTATIC PROPERTIES TO FIBROUS MATERIALS THROUGH TREATMENT WITH A POLYETHER CONTAINING TERMINAL UREA GROUPS AND A POLYFUNCTIONAL ALDEHYDE
Helmut Kirschnek, Georg von Finck, and Mathieu Quaedvlieg, Leverkusen, Germany, assignors to Farbenfabriken Bayer Aktiengesellschaft, Leverkusen, Germany, a German corporation
No Drawing. Filed Oct. 11, 1963, Ser. No. 315,703
Claims priority, application Germany, Oct. 24, 1962, F 38,123
Int. Cl. D06m 13/20, 13/18; D06p 5/00
U.S. Cl. 8—115.5         8 Claims

ABSTRACT OF THE DISCLOSURE

Process for imparting antistatic properties to a fibrous material by contacting the material with an aliphatic aldehyde and a compound of the formula:

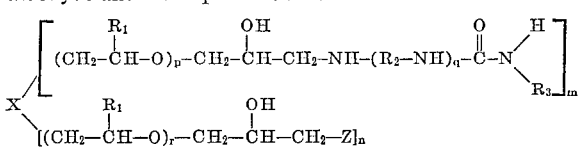

or the corresponding quaternary compound wherein:

X is defined as the residue of a polyhydroxy compound, polycarboxylic acid, polyamine, condensation product of a polyamine with a fatty acid, alkanolamine, hydroxy carboxylic acid, aminocarboxylic acid, phenol carboxylic acid or amino phenols, said radicals containing 2–10 hydrogen atoms reactive towards alklene oxides;
$R_1$ is hydrogen or alkyl;
$R_2$ is an aliphatic or aromatic radical;
$R_3$ is hydrogen, alkyl, alkoxy, alkoxyalkyl, or aryl radicals;
Z is a hydrogen, hydroxyl, alkyl, alkylamino, dialkylamino, diacylamidopropylamino, quaternary alkylammonium, aliphatic alcohol, fatty acid, fatty acid amide, polyamine, polyether, —COOH or —$NH_2$ radical;
$m$ is an integer of 2–6;
$n$ is a number of 0–4;
$p$ is a number of 1–100;
$q$ is a number of 0–4; and
$r$ is a number of 1–100.

---

The present invention relates to a process for treating fibrous materials; more particularly it concerns a process which consists in that the fibrous materials are treated with compounds containing urea groups of the formula

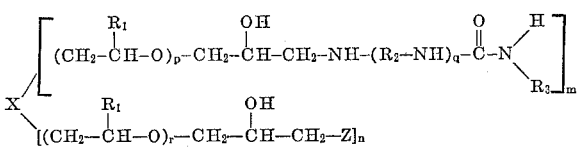

or their quaternary compounds in the presence of lower aliphatic aldehydes.

In the above formula, X denotes the radical of a compound containing at least two hydrogen atoms reactive towards alkylene oxides, $R_1$ denotes hydrogen or an alkyl radical, $R_2$ is an aliphatic, cycloaliphatic, or aromatic radical, and $R_3$ is hydrogen, an alkyl radical, alkoxy, radical, an alkoxyalkyl radical, or an aryl radical, $m$ is an integer of 2 to 6, $n$ is a number between 0 and 4, $p$ is a number of 1 to 100, $q$ is a number between 0 and 4, $r$ is a number of 1 to 100, and Z represents hydrogen, a hydroxyl group, or an organic or inorganic radical, for instance an aliphatic, cycloaliphatic, aromatic, or heterocyclic radical, the radical of an alkylamine or dialkylamine, a quaternary alkylammonium group, an aliphatic alcohol, a fatty acid, a fatty acid amide, polyamine, a polyimine, a polyester, a polyether, or a silicone, halogen, or the groups —COOH and —$NH_2$.

It may be assumed that the compounds containing urea groups of the above stated formula first reaction with the lower aliphatic aldehydes to produce compounds in which the urea groups have been converted to the corresponding alkylolurea groups.

A particular form of executing the present invention consists in that instead of applying the lower aliphatic aldehydes and the compounds containing urea groups of the above stated formula to the fibrous materials, use is made of the compounds already containing the alkylolurea groups which are prepared by the reaction of the compounds containing the urea groups with the lower aliphatic aldehydes.

Use may also be made of the products prepared from the compounds containing alkylolurea groups by etherification with lower aliphatic alcohols, since under the normal conditions of application they reform the compounds containing the alklol urea groups. In addition, it is also possible to employ those products which are obtainable from the quaternary compounds of the compounds containing urea groups of the above mentioned formula by their reaction with lower aliphatic aldehydes and, optionally, a subsequent etherification with lower aliphatic alcohols.

The treatment of the fibrous materials consists in that the materials are impregnated with solutions or dispersions containing the compounds under consideration which exhibit urea groups as well as lower aliphatic aldehydes, by means of the foularding ar absorption processes or that they are sprayed with solutions of this type, and that they are then dried at room temperature or at an elevated temperature, conveniently in the presence of catalysts.

The molar proportion of the aldehydes to the compounds containing urea groups may vary within wide limits; suitable proportions can readily be established in a given case by means of preliminary experiments. In general, it has proved appropriate to select a proportion of 0.5 to 3 moles of aldehyde per urea group, preferably a proportion of 0.5 to 1.5 moles of aldehyde per urea group.

As catalysts for the reaction of the aldehydes with the compounds containing urea groups, use may be made of the compounds normally employed for this purpose, for instance oxalic acid, monochloroacetic acid, glycollic acid, boric acid, hydrochloric acid, ammonium chloride, zinc chloride, zinc nitrate, zinc borofluoride, and magnesium chloride.

In addition to the aldehydes and the compounds exhibiting urea groups, the treatment liquors may also contain other auxiliaries common for the treatment of fibrous materials, for instance finishing agents, hydrophobisation agents, plasticisers, or pigments.

The compounds containing urea groups of the above mentioned formula which can be considered for the process according to the invention may be prepared by various methods, for instance by the reaction between compounds containing at least two active hydrogen atoms and alkylene oxides, by reaction of the resultant alkoxylation products with epihalohydrin, by reaction between the resultant halohydrin compounds or of the glycidyl ethers formed therefrom in known manner by elimination of hydrogen halide and ammonia or di- or poly-amines possessing primary amino groups, and by the subsequent conversion of at least two of the primary amino groups present in the reaction products thus built up to urea groups by means of potassium cyanate, urea, mitrourea, or isocyanates. It is also possible to employ those compounds prepared by the reaction between the reaction products containing a halohydrin or glycidyl ether group and urea compounds containing an aminoalkyl group as substituent.

The following may be mentioned as examples of compounds which contain at least two hydrogen atoms reactive towards alkylene oxides:

(a) Polyhydroxy compounds, particularly aliphatic bivalent alcohols with preferably 2–6 carbon atoms, such as for instance ethylene glycol, propylene glycol, and butylene glycol; also ether glycols such as diethylene glycol and triethylene glycol, as well as polyhydric alcohols such as glycerine, trimethylolpropane, penaerythritol, and sorbitol, and also mono- and di-saccharides of the type of glucose and saccharose as well as aromatic compounds with at least two hydroxyl groups, for instance resorcinol or 4,4'-dihydroxy-diphenyl; and eventually also the esters or ethers of such polyhydroxy compounds which exhibit two or more hydroxyl groups;

(b) Aliphatic, cycloaliphatic, or aromatic di- or polycarboxylic acids such as succinic acid, adipic acid, and trimellitic acid;

(c) Polyamines, particularly saturated aliphatic amines containing primary and/or secondary amino groups, such as ethylene diamine, propylene diamine, and butylene diamine, as well as diethylene triamine, triethylene tetramine, tetraethylene pentamine, and polyethylene-imine, and also condensation products of polyamines with fatty acids;

(d) Compounds which simultaneously contain several functional groups of the above mentioned types of compounds, for instance alkanolamines such as ethanolamine, diethanolamine, and triethanolamine, hydroxycarboxylic acids such as lactic acid and citric acid, aminocarboxylic acids such as alanine, glycine, as well as phenol-carboxylic acids and aminophenols.

As examples of alkylene oxides, mention may be made of ethylene oxides, propylene oxide, butylene oxide, or their mixtures. α-Epichlorhydrin is particularly suitable among the epihalohydrins.

The following may be mentioned as examples of di- and poly-amines containing primary amino groups: ethylene diamine, propylene diamine, 1,6-hexamethylene diamine, phenylene diamine, diethylene triamine, triethylene tetramine, tetraethylene pentamine, bis-(3-aminopropyl)-methylamine, as well as polyethylene-imine.

Groupings represented by Z may for instance have been prepared by the reaction of the chlorohydrin compounds or of the glycidyl ethers with the compounds containing the grouping Z.

By way of lower aliphatic aldehydes for the process according to the invention, use may in the first instance be made of formaldehyde, acetaldehyde, or glyoxal; the aldehydes may also be applied in the form of their compounds, for instance as dimethylol-formamide. Where it is intended to employ compounds containing alkylolurea groups, it is possible to achieve this by using products which have been obtained from the urea compounds by their reaction with lower aliphatic aldehydes in aqueous or alcoholic solution or suspension at pH values of 4–11, preferably 5–9, and at temperatures of 20–80° C. during a period of ½ to 4 hours.

The ethers of the alkylolurea compounds can be prepared by heating the alkylolurea compounds in the alcohol selected for etherification, which is present in excess, for instance butanol or methanol, in the presence of acids.

Compounds with quaternary ammonium groups can be prepared by the reaction of the compounds of the above mentioned formula with quaternising agents.

Where products of higher molecular weight have been formed during the reaction between the compounds containing the halohydrin groups or of the glycidyl ethers and ammonia or compounds containing primary amino groups, their conjoint use during the process according to the invention does not constitute a disadvantage since products of this type do not interfere.

The application of the process according to the invention makes possible the attainment of valuable finishing effects on fibrous materials of widely varying types, for instance on threads or fabrics of vegetable, animal, or synthetic origin. The type of the finishing effect depends on the radicals represented by X and Z in the formula given at the start, as well as on the proportion by weight existing between the ($CH_2$—$CHR_1$—O—) groups and the radicals X and Z. Thus, for instance, compounds where the proportion by weight of ($CH_2$—$CH_2$—O) groups exceeds the proportion by weight of the radicals X and Z are exceedingly suitable for an antistatic finish on fibrous materials of synthetic origin, and compounds where X and/or Z also represent radicals containing long-chain unbranched alkyl groups produce an excellent plasticising effect in addition to the antistatic effect, whilst compounds wherein X and/or Z represent radicals containing long-chain unbranched alkyl groups and where the proportion by weight of ($CH_2$—$CH_2$—O) groups does not exceed the proportion by weight of the radicals X and Z also exhibit a remarkable hydrophobisation effect in addition to the plasticising effect.

It must be emphasized that these finishing effects are largely resistant to washing, and in fact even when drying of the impregnated materials has been carried out at temperatures of only 100–120° C. In addition, the treatment liquors employed for carrying out the process according to the invention are very stable.

The compounds which also contain urea groups and have hitherto been employed together with lower aliphatic aldehydes or in the form of their alkylol derivatives for the treatment of fibrous materials do not exhibit these valuable effects to the same extent.

The parts specified in the following examples are parts by weight. The examples are given for the purpose of illustrating the invention, without, however, limiting its scope.

Example 1

A fabric from threads prepared from polyacrylonitrile, synthetic polyamides, or aromatic polyesters, for instance polyethylene terephthalate, is impregnated on a foularding machine by the usual method with an aqueous liquor, which contains, per litre, 60 g. of the 50% solution to be described below as well as 6 g. of 40% formaldehyde, and which has been adjusted to a pH value of about 4.5 by the addition of 1.5 g./l. of oxalic acid. The fabric is then squeezed out until it exhibits a weight increase of about 100%, and is dried on a stretcher frame by means of an air current at 120° C. during 4 minutes. The fabric thus treated exhibits an excellent antistatic effect even after frequently repeated washing with any desired household washing agents or after several dry cleaning operations at the temperatures normal for synthetic fibres.

It is also still possible to add, per litre of liquor, 1.5 g. of a cation-active plasticizer of the type of a condensation product of fatty acid and diethylene triamine; this causes an improvement of the feel of the treated fabric without affecting adversely the antistatic effect or its resistance to washing.

The employed 50% solution has been prepared as follows:

1 mole of trimethylol-propane was reacted with 50 moles of ethylene oxide, the resultant ethoxylation product was reacted with 3 mole of α-epichlorhydrin, and the resultant chlorhydrin compound was converted to the triglycidyl ether by elimination of hydrogen chloride, 1 mole of this compound was then heated at 95° C. with 3 moles of 1,6-hexamethylene diamine for 2 hours; 3 moles of aqueous hydrochloric acid as well as 3 moles of potassium cyanate, in a 40% aqueous solution, were thereafter added to the obtained reaction product. The reaction mixture was heated at 95° C. for about 2½ hours and then washed twice at 80–90° C. with an aqueous solution of sodium chloride; the upper phase which separates during this operation is removed and adjusted to a water content of 50% by the addition of water.

Example 2

The procedure is as described in Example 1, except that use is made of a treatment liquor which is adjusted either to a pH value of about 7 with 3 g./l. of ammonium chloride or to a pH value of 4.5 with aqueous hydrochloric acid, instead of being adjusted to a pH value of 4.5 with 1.5 g./l. of oxalic acid, in addition, drying of the fabric is then carried out at 130° C. During this procedure, a very good antistatic effect is again obtained on the treated fabric, which is resistant to washing.

Example 3

A fabric dyed with a common dyestuff and made with threads prepared from polyacrylonitrile, synthetic polyamides, or aromatic polyesters, is impregnated as usual on a foularding machine with an aqueous liquor which contains, per litre, 60 g. of the 50% solution described below and 6 g. of 40% formaldehyde, and which has been adjusted to a pH value of 3 by the addition of 1.5 g./l. of oxalic acid. The fabric is then squeezed out until it exhibits a weight increase of about 100%, and it is dried at 120° C. for 10 minutes in a drying cabinet. The fabric thus treated does not exhibit any appreciable electrostatic charging even after frequently repeated washing operations which had been carried out with fine washing agents at 40° C.

The employed 50% aqueous solution had been prepared by the following method:

The triglycidyl ether described in Example 1 was reacted with aqeuous ammonium hydroxide solution in a molar proportion of 1:3, by heating the mixture of the components first at 50° C. for 1 hour and subsequently at 70° C. for 1 hour. The reaction mixture was thereafter washed once with hot sodium chloride solution, and the separated reaction product was then neutralised with aqueous hydrochloric acid, treated with an aqueous solution of 3 moles of potassium cyanate, and heated at 90–95° C. for 2½ hours, with stirring. The reaction mixture was subsequently washed twice with hot sodium chloride solution. The upper phase separating during this operation was removed and adjusted to a water content of 50% by the addition of water.

Example 4

The procedure is as described in Example 1, except that use is made of a treatment liquor which contains, per litre, 60 g. of the 50% solution to be detailed below instead of 60 g. of the solution there specified. By this method, an antistatic finish resistant to washing is again obtained; the treated fabric at the same time also exhibits an improved feel.

The employed 50% solution had been prepared as follows:

1 mole of monostearyl-pentaerythritol ether was reacted with 50 moles of ethylene oxide, and the resultant ethoxylation product was converted to the corresponding product containing urea groups with the aid of α-epichlorhydrin, 1,6-hexamethylene diamine, and potassium cyanate, as described in Example 1, which was then treated with the required amount of water.

Example 5

A fabric of threads which had been prepared from polyacrylonitrile, synthetic polyamides, or aromatic polyesters, is impregnated as usual on a foularding machine with an aqueous liquor which contains, per litre, 100 g. of one of the two 30% solutions to be described below as well as 5.5 g. of 40% formaldehyde and which is adjusted to a pH value of 4.5 by the addition of 1 g./l. of oxalic acid. The fabric is subsequently treated further according to the statements in Example 1. The fabric exhibits an improved feel, particularly after it has been washed once, and indicates a very good antistatic effect which is resistant to washing.

One of the two 30% solutions had been prepared as follows:

1 mole of trimethylol-propane was reacted with 25 moles of ethylene oxide, the resultant ethoxylation product was reacted with 3 moles of α-epichlorhydrin and the obtained chlorhydrin compound was converted to the triglycidyl ether by elimination of hydrogen chloride. 1 mole of this compound was then heated at 110° C. with 1 mole of distearylamine for 2 hours, and the product was subsequently still heated at 95° C. with 2 moles of 1,6-hexamethylene diamine for 2 hours. Four times its amount of water, containing 3 moles of dissolved hydrogen chloride, was then first added to the reaction mixture, whilst stirring, and subsequently a concentrated solution of 3 moles of potassium cyanate. After stirring at 90° C. for three hours, the reaction product was washed twice with hot sodium chloride solution; the upper phase separating during this operation was adjusted to a water content of 70% by the addition of water.

The other of the two 30% solutions had been prepared by the same method as described above, except that in this case the condensation product of 1 mole of dipropylene triamine with 2 moles of stearic acid was employed instead of 1 mole of distearylamine.

Example 6

The procedure is as described in Example 5, except that use is made of a treatment liquor which contains, per litre, 100 g. of the 30% solution to be detailed below instead of 100 g. of one of the two 30% solutions there specified. A very good finish with resistance to washing and an improvement in the feel are then again attained on the fabric.

The employed 30% solution had been prepared as follows:

The reaction product, which had been obtained during the preparation first described in Example 5 after washing twice with hot sodium chloride solution, was then still quaternised with 1 mole of dimethyl sulphate by a method known per se, and thereafter also adjusted to a water content of 70%.

Example 7

A fabric of threads which had been prepared from staple rayon, cotton, wool, polyacrylonitrile synthetic polyamides, or polyesters, is treated in a foularding machine with an aqueous liquor which contains, per litre, 100 g. of the 30% solution to be described below as well as 4.2 g. of 40% formaldehyde and which is adjusted to a pH value of 4 by the addition of 0.6 g./l. of oxalic acid. The fabric is squeezed out until it exhibits a weight increase of 100% and is then dried at 120° C. for ten minutes in a drying cabinet. After this treatment, it exhibits a water-repellent effect stable for several washing operations, possesses a soft and full feel, and only has a weak residual tendency for being charged electrostatically.

The employed 30% solution had been prepared as follows:

1 mole of trimethylol-propane was reacted with 10 moles of ethylene oxide, the resultant ethoxylation product was reacted with 3 moles of α-epichlorhydrin and the obtained chlorhydrin compound was converted to the triglycidyl ether by the elimination of hydrogen chloride. 1 mole of this compound was then reacted with distearylamine, 1,6-hexamethylene diamine, and potassium cyanate in accordance with the statements made in Example 5 for the method of preparation first specified there. The reaction product was converted to a 30% aqueous solution after having been worked up as usual.

Example 8

The procedure is as described in Example 1, except that the liquor there specified is replaced by a liquor which contains, per litre, 100 g. of the 30% solution to be detailed below as well as 7 g. of 40% formaldehyde and which is adjusted to a pH value of 4 by the addition of 1.5 g./l. of oxalic acid. The treated fabric then exhibits a very good antistatic effect; this finish is stable throughout several washing operations which are carried out in a washing machine with the use of the usual household washing agents.

The employed 30% solution had been prepared as follows:

1 mole of pentaerythritol was reacted in an autoclave at 140° C., first with 4 moles of propylene oxide and subsequently still with 25 moles of ethylene oxide. The reaction product was thereafter reacted with 4 moles of α-epichlorhydrin. 1 mole of the chlorhydrin compound thus formed was then heated at 95° C. with 4 moles of 1,4-tetramethylene diamine for 2 hours; the reaction mixture was thereafter treated with 4 moles of potassium cyanate, in 40% aqueous solution, and heated at 95° C. for another 2½ hours. The reaction product was washed twice with hot sodium chloride solution, the upper phase separating during this operation was removed and adjusted to a water content of 70% by the addition of water.

Example 9

The procedure is as described in Example 1, except for the difference that use is made of a treatment liquor which contains 60 g. of the 50% solution to be detailed below instead of 60 g. of the solution there specified. By this method, an antistatic effect resistant to washing is again obtained.

The employed 50% solution had been prepared as follows:

1 mole of the polyethylene glycol triglycidyl ether which had been obtained by the reaction between 1 mole of trimethylol-propane and 50 moles of ethylene oxide, the action of 3 moles of α-epichlorhydrin, and subsequent elimination of hydrogen chloride, was heated to 100° C. with 3 moles of β-aminoethylurea for two hours. The reaction mixture was then washed twice with hot sodium chloride solution; the upper phase separating during this operation was removed and adjusted to a water content of 50% by the addition of water.

Example 10

The procedure is as described in Example 1, except that the treatment liquor there specified is replaced by a liquor which contains, per litre, 60 g. of the 50% solution to be detailed below and which is adjusted to a pH value of about 4.5 by the addition of 1.5 g./l. of oxalic acid. The antistatic effect attained by this method is stable towards much washing.

The employed 50% solution had been prepared as follows:

1 mole of the polyethylene glycol triglycidyl ether which had been obtained by the reaction between 1 mole of trimethylol-propane and 50 moles of ethylene oxide, the action of 3 moles of α-epichlorhydrin, and subsequent elimination of hydrogen chloride, was heated at 100° C. with 3 moles of β-aminoethylurea for 2 hours. The product containing urea groups was dissolved in methanol, the weakly alkaline solution was treated with 3 moles of formaldehyde in the form of paraformaldehyde, heated at 60° C. for 1 hour, and then treated with sufficient oxalic acid for a sample diluted with a little water to exhibit a pH value of about 3. The product now containing methylolurea groups was subsequently heated at 65° C. under reflux for another 2 hours, in order to etherify the methylol groups. The methanolic solution was neutralised with solid sodium carbonate, then filtered, and evaporated in vacuo. The resultant product was converted to a 50% aqueous solution with a pH value between 7 and 8.

Example 11

The procedure is as described in Example 1, except that the fabric is not dried by means of an air current at 120° C. for 4 minutes, but instead by storage at room temperature for seven days. The fabric then again exhibits an antistatic effect resistant to washing.

We claim:

1. A method for imparting antistatic properties to a fibrous material comprising contacting the fibrous material with an aliphatic aldehyde or decomposable formamide addition product thereof and with a compound of the formula $$X \begin{bmatrix} (CH_2-\underset{R_1}{CH}-O)_p-CH_2-\underset{OH}{CH}-CH_2-NH-(R_2-NH)_q-\overset{O}{\underset{\|}{C}}-N\diagup_{R_3}^{H} \end{bmatrix}_m$$
$$[(CH_2-\underset{R_1}{CH}-O)_r-CH_2-\underset{OH}{CH}-CH_2-Z]_n$$

or the corresponding quaternary compound wherein:

X is defined as the residue of a polyhydroxy compound, a polycarboxylic acid, a polyamine, a condensation product of a polyamine with a fatty acid, an alkanolamine, a hydroxy carboxylic acid, an aminocarboxylic acid, a phenol carboxylic acid or an amino phenol, said radicals containing 2–10 hydrogen atoms reactive towards alkylene oxides;
$R_1$ is a hydrogen or lower alkyl;
$R_2$ is an aliphatic radical;
$R_3$ is hydrogen or alkyl;
Z is a hydrogen, hydroxyl, halogen, —COOH, —NH$_2$, distearylamino, distearoylamido, propylamino, and $$-NH\left(-R_2-NH\right)_q-H$$

$m$ is an integer of 2–6;
$n$ is a number of 0–4;
$p$ is a number of 1–100;
$q$ is a number of 0–4; and
$r$ is a number of 1–100.

2. A method for treating fibrous materials wherein the fibrous materials are treated with compounds containing alkylolurea groups prepared by reacting the compound having the formula of claim 1 and a lower aliphatic aldehyde, or corresponding ethers obtained by reacting with a lower aliphatic alcohol.

3. The method of claim 1 wherein the fibrous material is at least one of rayon, cotton, wool, polyacrylonitrile, synthetic polyamide and polyester fibers.

4. The method of claim 1 wherein the aliphatic aldehyde or corresponding addition product thereof is a member selected from the group consisting of formaldehyde, acetaldehyde, glyoxal and dimethylol-formamide.

5. The method of claim 1 wherein the ratio in mols of aldehyde to each urea group is about .5–1.5:1

6. The method of claim 1 wherein the treatment is effected in the presence of a catalytic amount of a compound selected from the group consisting of oxalic acid, monochloroacetic acid, glycollic acid, boric acid, hydrochloric acid, ammonium chloride, zinc chloride, zinc nitrate, zinc borofluoride, and magnesium chloride.

7. The method of claim 1 wherein X is a member selected from the group consisting of a bivalent alcohol of 2–6 carbon atoms, an ether glycol, a monosaccharide, a disaccharide, an aromatic compound having at least two hydroxyl groups, and esters and ethers of polyhydroxy compounds having two or more hydroxyl groups.

8. An antistatic fiber treating composition consisting essentially of an aliphatic aldehyde or decomposible formamide addition product thereof, water, an acid, and a compound of the formula

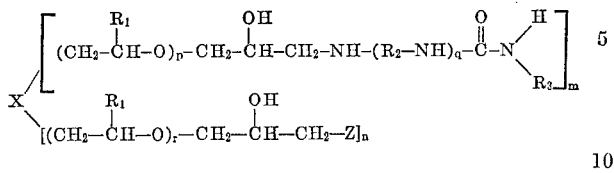

or the corresponding quaternary compound wherein:

X is defined as the residue of a polyhydroxy compound, a polycarboxylic acid, a polyamine, a condensation product of a polyamine with a fatty acid, an alkanolamine, a hydroxy carboxylic acid, an amino carboxylic acid, a phenol carboxylic acid or an amino phenol, said radicals containing 2–10 hydrogen atoms reactive towards alkylene oxides;

$R_1$ is hydrogen or lower alkyl;
$R_2$ is an aliphatic radical;
$R_3$ is hydrogen or alkyl;

Z is a hydrogen, hydroxy, halogen, —COOH, —$NH_2$, distearylamino, distearoylamido propylamino, and

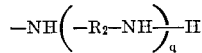

$m$ is an integer of 2–6;
$n$ is a number of 0–4;
$p$ a number of 1–100;
$q$ is a number of 0–4; and
$r$ is a number of 1–100.

References Cited

UNITED STATES PATENTS 3,324,176  6/1967  Kirschnek et al. _____ 260—553

NORMAN G. TORCHIN, Primary Examiner

J. CANNON, Assistant Examiner

U.S. Cl. X.R.

8—115.6, 115.7, 116.2, 116.3, 128, 130.1; 117—138.8, 139.5